HELMUT ETTISCHER
KURT STEISSLINGER
INVENTORS

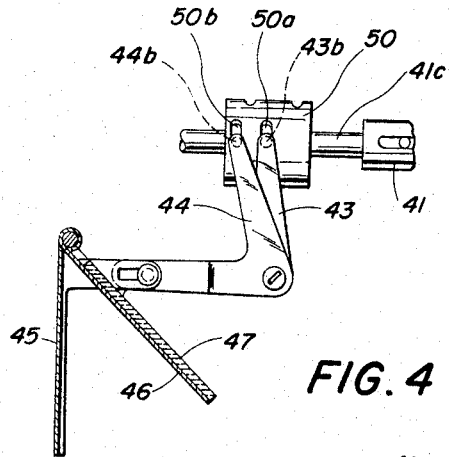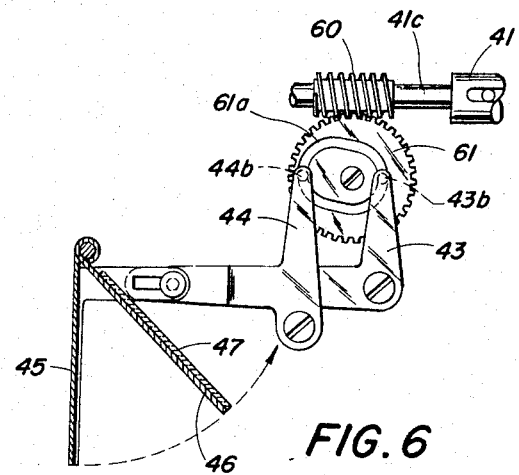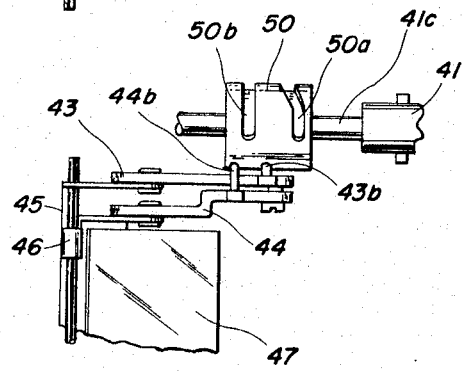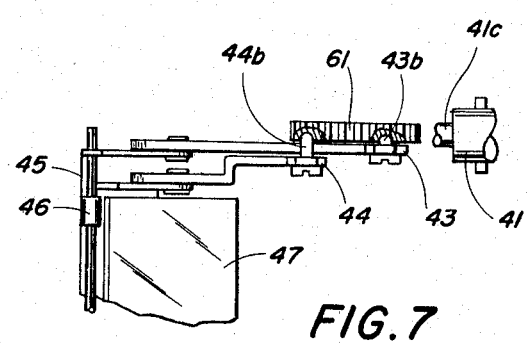

United States Patent Office 3,319,551
Patented May 16, 1967

3,319,551
SINGLE LENS REFLEX CAMERA
Helmut Ettischer, Ruit, Kreis Esslingen, and Kurt Steisslinger, Stuttgart-Hedelfingen, Germany, assignors to Eastman Kodak Company, Rochester, N.Y., a corporation of New Jersey
Filed Sept. 15, 1964, Ser. No. 396,503
3 Claims. (Cl. 95—42)

This invention relates generally to cameras, and more particularly to an improved single lens reflex camera.

Single lens reflex cameras having a manually movable film transport member for cocking the shutter and moving the mirror into a viewing position against the bias of a resilient means are well known in the art. When the camera shutter release member is depressed or actuated, the mirror and cover flap are moved to their inoperative positions, and the shutter released for exposure. The mirror and cover flap normally remain in their inoperative positions until the next movement of the film transport mechanism.

It is further known in the art to provide a single lens reflex camera with a spring mechanism which is tensioned upon movement of the film transport mechanism to advance the film. When the camera shutter release member is actuated, the spring mechanism moves the mirror and cover flap to their inoperative positions, releases the shutter, and returns the mirror and cover flap to their operative positions in that order. The movement of the mirror, cover flap, and shutter is effected by means of cam plates which have to be carefully adjusted relative to one another. Such a camera mechanism requires a large space.

In another known type of single lens reflex camera having a focal plane shutter, a spring is tensioned as the camera shutter release member is moved to release the shutter. After the shutter paritially runs down, it releases the spring which moves the mirror from its operative or viewing position to its inoperative position. As the mirror is moved to its inoperative position, it tensions a weaker spring which, after the shutter has completely run down, returns the mirror to its viewing position.

In a further modification, manual movement of the release lever moves the mirror to its inoperative position and then releases the shutter. Disengaging the release lever causes the mirror to be returned to its viewing position indepedent of the duration of the exposure. One disadvantage of such a camera mechanism is that the strong pressure required to move the release lever causes camera movement which increases the danger of blurring the exposed image.

In reflex cameras of the prior known type, the following operational sequence normally occurs in operating the camera, namely, advancing the film, moving the mirror and cover flap into their operative positions, cocking the shutter, opening the diaphragm and shutter blades to their maximum aperture so that the operator may view the scene desired to be photographed on the viewing screen, closing the shutter blades and moving the diaphragm blades to a preselected opening, moving the mirror and cover flap to their inoperative positions, and releasing the shutter to make an exposure. It can be readily appreciated that to provide a reflex camera in which the above-mentioned events are automatically and satisfactorily accomplished in proper timed relation with the minimum number of moving parts and effort is a Herculean task. The prior art reflex cameras while operating satisfactorily have the additional disadvantage of being much too complicated and expensive. Furthermore, since they have a large number of moving parts, the operating and maintenance problems are greatly increased. A further disadvantage of the prior art reflex cameras is that many of the above-mentioned operations, which have no direct connection with the exposure itself, are effected by the shutter mechanism.

One of the objects of the present invention is to provide an improved single lens reflex camera of simple design and construction, thoroughly reliable and efficient in operation, and economical to manufacture.

Another object of the invention is to provide an improved single lens reflex camera in which the control functions performed or actuated by the shutter mechanism are held to a minimum.

A more specific object of the invention is to provide an improved single lens reflex camera having a mechanism for coupling the film transport and shutter cocking mechanism to both the mirror and cover flap control mechanism, and the means for controlling the shutter and diaphragm blades, the coupling mechanism being controlled by an actuating member responsive to the running down movement of a between-the-lens shutter.

Objects and advantages other than those set forth above will be apparent from the following description when read in connection with the accompanying drawings, in which:

FIG. 1 is a perspective view of a single lens reflex camera constructed in accordance with a preferred embodiment of this invention and showing the camera mechanism after it has advanced the film, cocked the shutter, and moved the shutter blades to their closed position, and the diaphragm blades to their maximum aperture position, the cover flap and mirror mechanism being omitted in part for purposes of clarity;

FIG. 4 is a segmental side elevation view of a modification of the cover flap and mirror moving mechanism of FIG. 3;

FIG. 5 is a top plan view of the structure of FIG. 4;

FIG. 6 is a segmental side elevation view of another modification of the cover flap and mirror moving mechanism of FIG. 3; and FIG. 7 is a top plan view of the structure of FIG. 6 with a gear omitted for purposes of clarity.

Figures 1, 3:
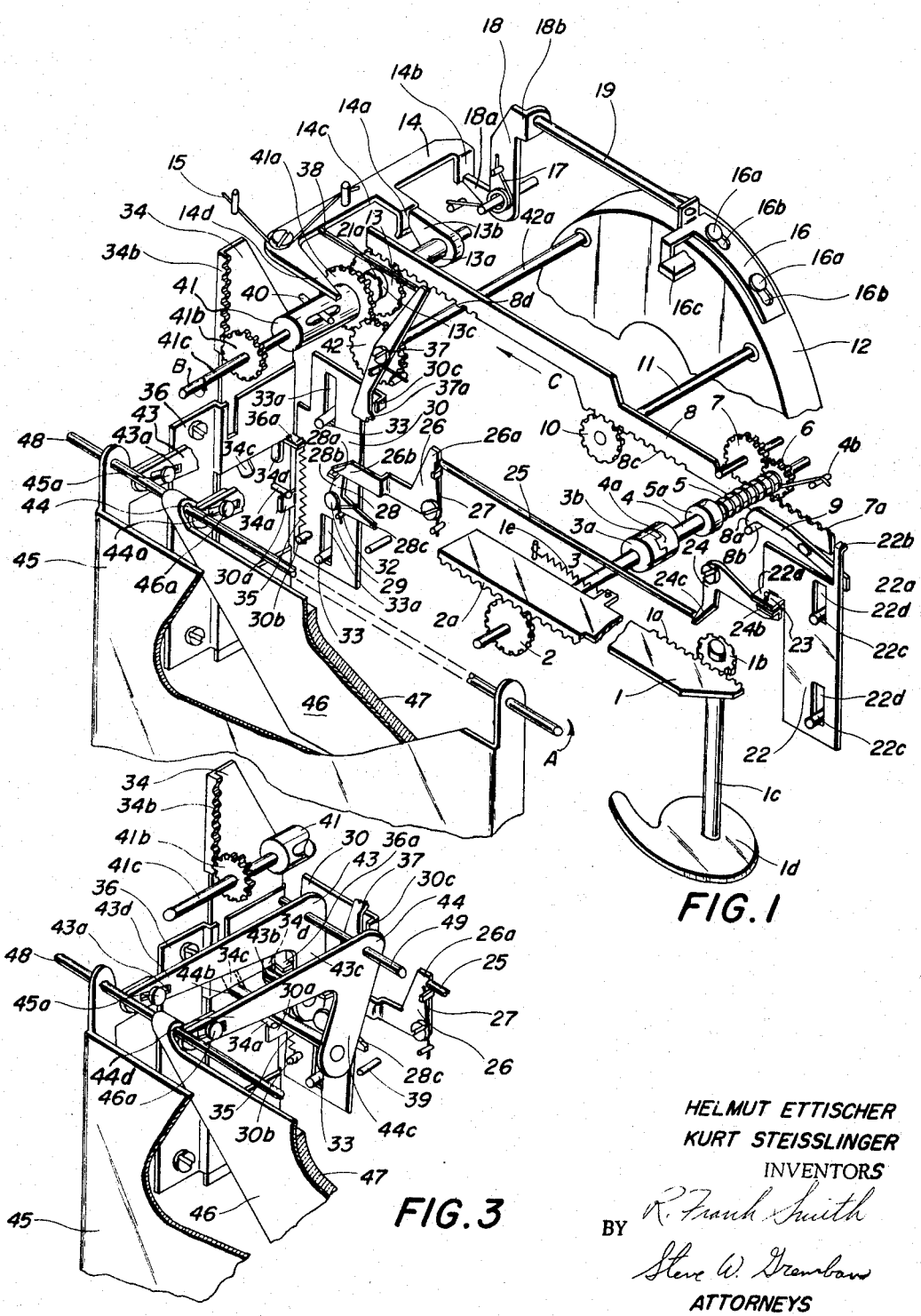
FIG. 3 is a segmental view in perspective showing the cover flap and mirror moving mechanism omitted from FIGS. 1 and 2.

Referring to the drawings, a preferred embodiment of a single lens reflex camera according to the present invention is disclosed having a between-the-lens shutter 12 of a well-known type in the art such as disclosed in U.S. Patents 2,900,886 and 3,067,665. Such a shutter is further commercially available under the Synchro-Compur X trademark. The shutter 12 has a shaft 11 and pinion 10 for controlling the cocking and release of the shutter mechanism to make an exposure, and another shaft 42a and pinion 42 for controlling the movement of the shutter blades, not shown, to their closed position and the diaphragm blades, not shown, from a maximum aperture position to a preselected value prior to making an exposure. The shutter 12 further has an actuating member 16 slidably mounted on its periphery by virtue of headed rivets 16a extending through elongated slots 16b. The member 16 is responsive to the shutter mechanism 12 and is movable counterclockwise by a portion, not shown, of said mechanism 12 from a normal inoperative position, in which member 16 is in engagement with a stop 16c as seen in the drawings and to which it is moved shortly before completion of the film winding and shutter cocking operation, to an operative position, shown dotted, during the last phase of the exposure operation for a purpose to be explained hereinafter.

The film winding and shutter cocking mechanism comprises a gear rack 1 having gear teeth 1a along one edge in mesh with a pinion 1b mounted on a shaft 1c. The shaft 1c is movable in a counterclockwise direction by a handle 1d for moving rack 1 in one direction against the bias of a spring 1e for advancing a film by any suitable winding mechanism, not shown, driven by rack 1. Gear teeth 2a along another edge of rack 1 is in mesh with a pinion 2 on a shaft 3 having an enlarged end 3a with a shoulder 3b thereon. Movement of shaft 3 in a clockwise direction, causes shoulder 3b to engage a projection 4a on a shaft 4 and turn shaft 4 and a pinion 6 mounted thereon in the same direction. The pinion 6 is in mesh with a gear 7 which is rotated in a counterclockwise direction thereby urging a rack 8 to the right as seen in FIG. 1 by virtue of gear 7 meshing with teeth 7a along one edge thereof. As rack 8 is moved to the right upon clockwise movement of shaft 4, a spring 5, encircling shaft 4 and having one end thereof secured to an annular member 4a and its opposite end engaging a fixed pin 4b, is tensioned. A pin 8a carried by rack 8 engages a hook 8b at one end of a lever 9 and cams the lever out of the way, the hook 8b falling behind pin 8a as it passes by for holding rack 8 in a cocked position against the bias of the tensioned spring 5. During the movement of rack 8 to its tensioned position, teeth 8c along an edge thereof drives pinion 10 and shaft 11 in a direction to cock shutter 12. The opposite end of rack 8 has gear teeth 8d on one edge thereof for driving gear 13 mounted on a shaft 13a in a counterclockwise direction for moving an arm 13b carried by shaft 13a into engagement with a lug 14a of a pivotal lever 14 for camming it to an inoperative position and holding it there. In addition, shortly before the completion of the film winding and shutter cocking operation, the aforementioned actuating member 16 mounted on the side of shutter 12 and controlled thereby is returned in a clockwise direction to its normal position in engagement with stop 16c. A pivotal lever 18 connected to actuating member 16 by a rod 19 is urged by a spring 17 in a clockwise direction causing an arm 18a thereof to be moved in front of lug 14b of the aforementioned lever 14. Also, shortly before the completion of the film winding and shutter cocking operation, a notch 13c in the hub of gear 13 is moved by rack 8 into register with a projection 21a on an axially movable coupling member 21 and which is urged by a spring 20 into notch 13c. The notch 13c and projection 21a form a disconnectable coupling of a known type. Following the film winding and shutter cocking operation, the rack 1, handle 1d, pinion 2 and shaft 3 of the single lens reflex camera are returned by spring 1e to their normal positions shown in FIG. 1.

A camera release slide member 22 is guided for reciprocal movement by pins 22c extending through elongated slots 22d upon manual depression of member 22 by a lug 22b. The release member 22 has a lug 22a carrying an adjustable screw 23 for engaging a lug 24a on an arm 24b of a two-armed pivotal lever 24. A connecting rod 25 interconnects an arm 24c of lever 24 to an arm 26a of a two-arm pivotal shift lever 26. A spring 27 urges shift lever 26 in a clockwise direction into engagement with connecting rod 25. The other arm 26b of shift lever 26 engages a lug 28a on an arm 28b of a two-armed lever 28 pivotally mounted on a headed stub shaft 29 carried by a cocking slide member 30. A spring 31 urges lever 28 in a clockwise direction into engagement with a fixed stop pin 32 mounted on cocking lever 30. Accordingly, depression of release member 22 pivots levers 24, 26 causing arm 26b to slidably move cocking member 30, guided by pins 33 extending through slots 33a, downwardly against the bias of a spring 35. As slide member 30 is moved downwardly, a tab 30c thereon engages a lug 37a on a pivotal lever 37 and urges the lever in a clockwise direction against the bias of its spring 37b. When tab 30c passes lug 37a, lever 37 is moved back to its original position causing lug 37a to move in front of tab 30c and provide a stop therefor. The opposite end of lever 37 is connected by a rod 38 to an edge 14c of lever 14 and is responsive to pivotal movement of lever 14. Also, substantially simultaneously, an arm 28c of lever 28 engages a fixed pin 39 whereupon continued downward movement of cocking member 30 causes lever 28 to be pivoted in a counterclockwise direction withdrawing lug 28a from engagement with arm 26b.

The control silde mechanism for controlling the movement of a cover flap 45 and a support 46 for a mirror 47, both of which are pivotally mounted on a shaft 48, and also controlling the movement of the shutter and diaphragm blades, not shown, to a closed and predetermined value setting respectively prior to making an exposure, comprises a slide member 34 slidably mounted in a fixed guide member 36 which is secured to the camera housing, not shown. Downward movement of slide member 34 moves cover flap 45 and mirror 47 from their operative to their inoperative positions through a pair of two-armed levers 43, 44 mounted on a common shaft 49 and having respective pins 43b, 44b secured to the ends of respective arms 43c, 44c and extending through respective control grooves 34c, 34d in slide member 34. The ends of arms 43d, 44d of respective levers 43, 44 are connected to cover flap 45 and mirror support 46 respectively through suitable rivets 45a, 46a slidabley movable within respective slots 43a, 44a. Accordingly, with this mechanism, it is clear that downward movement of slide member 34 will pivotally move levers 43, 44 causing the cover flap 45 and mirror support 46 respectively to be moved in the direction of the arrow "A" into their inoperative positions.

The slide member 34 has a gear rack 34b thereon for driving a pinion 41b mounted on a shaft 41c. The shaft 41c has a cup-shaped end 41 terminating in a gear 41a secured thereto. The end 41 has a bore for slidably receiving the aforementioned spring 20 and coupling member 21. A pin 40 is carried by coupling member 21 with its ends thereof extending through elongated slots, not shown, in the cup-shaped end 41 so that member 21 is axially slidable therein for moving projection 21a into and out of engagement with notch 13c. The gear 41a drives pinion 42 mounted on shaft 42a connected to shutter 12 for initially moving the shutter blades, not shown, to their closed position so that the cover flap 45 and mirror 47 can be moved to their inoperative positions without exposing the film, and to further move the diaphragm blades, not shown, from their maximum aperture position to a preselected opening for the exposure.

Figure 2:
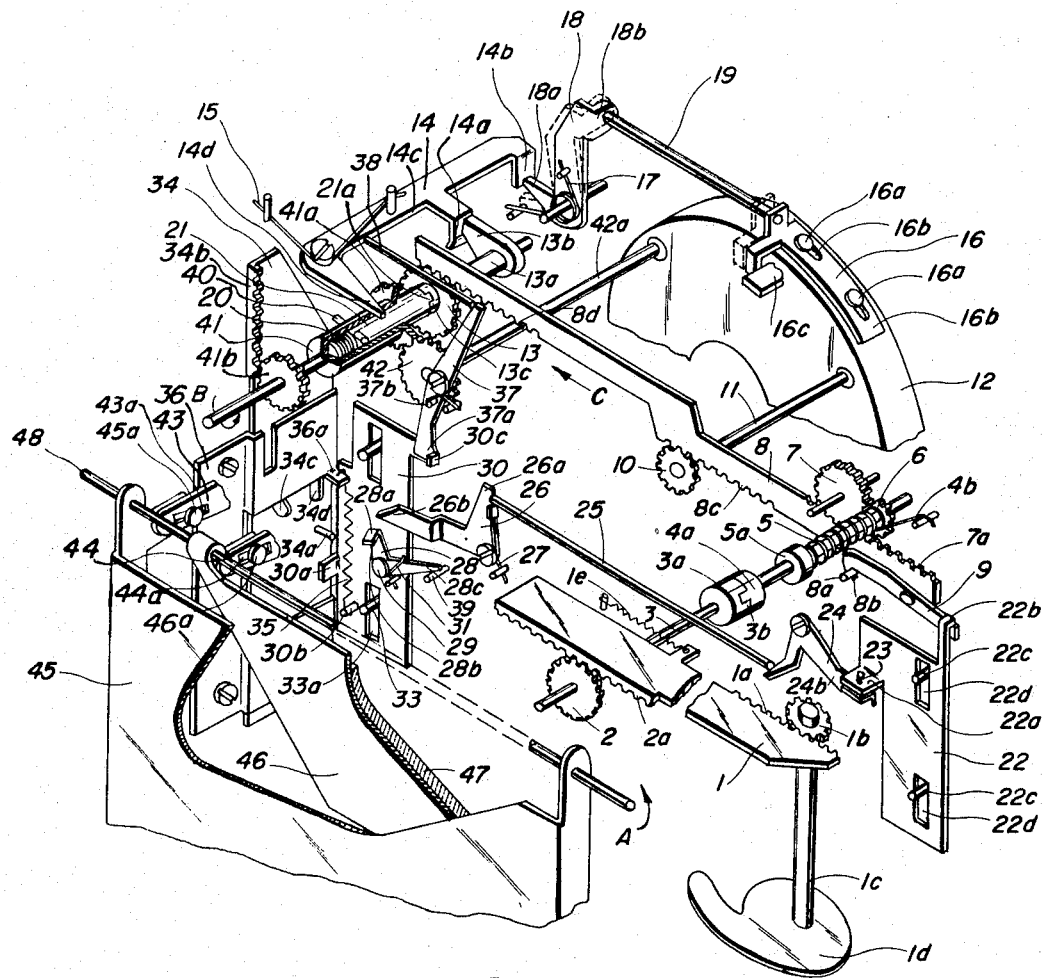
FIG. 2 is a view similar to FIG. 1 showing the release member in a partially depressed position prior to releasing the camera mechanism to make an exposure.

Accordingly, it is clear that the initial depression of release slide member 22 cocks the cocking lever 30, and further depression thereof releases gear rack 8 which is driven by tensioned spring 5 and gears 6, 7 in the direction of the arrow 6 as seen in FIG. 2. This movement of rack 8 moves the shutter blades to their closed position and the diaphragm blades from their maximum aperture to a preselected opening through teeth 8d, gear 13, projection 21a and notch 13c coupling, gear 41a, gear 42 and shaft 42a. The rack 8 further drives slide member 34 downwardly through gear 41b for moving the cover flap 45 and mirror 47 from their operative position to their inoperative position. Near the completion of the movement of rack 8 in the direction of arrow C, the shutter 12 is released by gear 10 and shaft 11 causing the shutter blades to open and close in a known way to make an exposure. During the last phase of the exposure process, the actuating member 16 on shutter 12 is slidably moved by a portion, not shown, of the shutter mechanism 12 in a counterclockwise direction, shown dotted in FIG. 2, pivoting stop lever 18 through connecting rod 19 and removing arm 18a from in front of lug 14b of lever 14. Since arm 13b previously had been moved out of engagement with lug 14a by the aforementioned rotation of gear 13 and shaft 13a by rack 8 in a counterclockwise direction, and pin 40 had previously been moved by rack 8, gear 13, projection 21a and notch 13c coupling, and member 21 in the direction of arrow B positioning pin 40 within the range of an arm 14d of lever 14, it is free to pivot in a clockwise direction by virtue of its spring 15 causing arm 14d to engage pin 40 and axially move coupling member 21 in a direction to disengage the projection 21a-notch 13c coupling. Clockwise movement of lever 14 pivots lever 37 through rod 38 withdrawing lugs 37a from in front of tab 30c for releasing the cocked member 30. The cocked member 30 is urged upwardly by its tensioned spring 35 causing a lug 30a thereon to engage a pin 43a carried by control slide member 34 and move it upwardly to its initial position for returning the cover flap 45 and mirror 46 to their operative positions. The upward movement of the cocking and control slide members 30, 34 respectively, is terminated when pins 33 reach the end of their slots 33a. The upward movement of control slide member 34 drives gear 41b, shaft 41c, and gear 41a in a clockwise direction causing gear 42 and connecting shaft 42a to move the shutter and diaphragm blades, not shown, to their maximum aperture position. Accordingly, the camera is once again in its initial position in which the operator may view the subject prior to advancing the film in preparation to making an exposure.

Although a pin and slot connection is used between control slide member 34 and cover flap 45 and mirror 46, other mechanisms can be used for accomplishing the same objective. For instance, in FIGS. 4 and 5, the slide member, rack, and gear are eliminated, and instead a control drum 50 mounted on shaft 41c having peripheral grooves 50a, 50b therein for receiving respective pins 43b, 44b on the ends of respective two-armed levers 43, 44. A connection, not shown, such as a gear and rack, would have to be interposed between cocking slide member 30 and control drum 50 for returning the cover flap 45 and mirror 46 to their operative positions.

FIGS. 6 and 7 disclose a still further modification in which a worm 60 is substituted for control drum 50 for driving a gear 61 having a groove 61a in its side surface for receiving pins 43b, 44b on the ends of respective arms 43, 44.

The invention has been described in detail with particular reference to a preferred embodiment thereof, but it will be understood that variations and modifications can be effected within the spirit and scope of the invention as described hereinabove and as defined in the appended claims.

We claim:

1. In a single lens reflex camera, the combination comprising:
 a set-type shutter mechanism including shutter blades which are initially movable from a maximum aperture position to a closed position and then opened and closed to make an exposure, and including diaphragm blades which are movable from a maximum aperture position to a selected aperture position for exposure;
 a mirror and a light blocking flap pivotally movable between a blocking position in which they respectively reflect and block light rays entering said camera, and a normal unblocking position in which they are removed from the path of said light rays;
 film advancing means;
 means connecting said film advancing means to said shutter mechanism and including a first power means movable to a tensioned position upon movement of said film advancing means to advance the film, and during said movement cocking said shutter and moving said shutter blades to their closed position;
 means for releasably latching said connecting means against the bias of said first power means in its tensioned position;
 means for moving said mirror and cover flap between their blocking and unblocking positions;
 means releasably coupling said connecting means to said moving means;
 release means for said first power means and said shutter;
 a second power means responsive to movement of said release means for movement from a normal position to a tensioned position;
 means for releasably holding said second power means in its tensioned position;
 means interconnecting said second power means and said mirror and cover flap moving means so that movement of said second power means to its normal position causes said moving means to move said mirror and cover flap to their unblocking position; and
 means interposed between said coupling means and said shutter mechanism, and responsive to said shutter mechanism at the conclusion of an exposure to (1) uncouple said coupling means and (2) release said holding means.

2. The invention according to claim 1 and further including a cam member responsive to said connecting means, and an actuating member on said shutter, said means interposed between said coupling means and said shutter mechanism comprising a pivotal lever controlled by said cam member and said actuating member for movement to an operative position in which said lever uncouples said coupling means and releases said holding means.

3. The invention according to claim 2 in which said coupling means comprises a slidable member having a projection engageable with a notch in an element driven by said connecting means, said slidable member having a pin engageable by a portion of said lever, said holding means comprises a pivotal latch element for latching said second power means in its tensioned position, and a rod connecting said lever to said latch element.

References Cited by the Examiner
UNITED STATES PATENTS

| | | | |
|---|---|---|---|
| 2,730,025 | 1/1956 | Faulhaber | 95—42 |
| 2,925,023 | 2/1960 | Harter | 95—42 |
| 2,992,601 | 7/1961 | Heden | 95—42 |
| 3,074,333 | 1/1963 | Hahn | 95—42 |
| 3,075,443 | 1/1963 | Reiche | 95—42 |
| 3,126,806 | 3/1964 | Wiessner | 95—42 |

JOHN M. HORAN, *Primary Examiner.*